(12) United States Patent
Lin et al.

(10) Patent No.: US 7,840,716 B2
(45) Date of Patent: Nov. 23, 2010

(54) COMMUNICATION METHOD FOR STORAGE DEVICES ON THE BASIS OF FILE ACCESS

(75) Inventors: Fan-Sheng Lin, Taipei (TW); Chao-Kuei Chung, Taipei (TW)

(73) Assignee: Etrovision Technology, Taipei (TW)

( * ) Notice: Subject to any disclaimer, the term of this patent is extended or adjusted under 35 U.S.C. 154(b) by 1408 days.

(21) Appl. No.: 11/272,806

(22) Filed: Nov. 15, 2005

(65) Prior Publication Data

US 2007/0050418 A1 Mar. 1, 2007

(30) Foreign Application Priority Data

Aug. 31, 2005 (TW) .............................. 94129947 A (51) Int. Cl.
*G06F 3/00* (2006.01)
*G06F 13/12* (2006.01)
*G06F 13/00* (2006.01)

(52) U.S. Cl. .................. 710/5; 710/62; 710/74; 711/100; 719/321; 719/325; 719/327

(58) Field of Classification Search ................. 707/705; 710/1, 5–7, 62, 72, 74; 711/100, 147; 719/312, 719/313, 321–327, 310
See application file for complete search history.

(56) References Cited

U.S. PATENT DOCUMENTS 7,167,951 B2 * 1/2007 Blades et al. ................ 711/114

* cited by examiner

*Primary Examiner*—Alford W Kindred
*Assistant Examiner*—Richard Franklin
(74) *Attorney, Agent, or Firm*—Radin & Berdo, P.C.

(57) ABSTRACT

A communication method for storage device on the basis of file access is provided. When a storage controller is added with a nonstandard control function, a command file and a response file are virtually produced in the memory as the communicating interface with an application program. The virtual files can then be read and written using the standard storage control protocol. This avoids modifying the communicating interface between the driver program and the application program for the newly added nonstandard control protocol.

18 Claims, 7 Drawing Sheets

COMMUNICATION METHOD FOR STORAGE DEVICES ON THE BASIS OF FILE ACCESS

BACKGROUND OF THE INVENTION

1. Field of the Invention

The invention relates to a communication method for storage devices and, in particular, to a communication method for storage devices on the basis of file access.

2. Related Art

Most of the storage devices are designed according to a standard storage control protocol. Therefore, they only support the basic storage functions. Driven by the market needs and the differences among manufacturers, the hardware is sometimes added with new functions. However, the standard storage control protocol cannot satisfy the requirements of these functions. Thus, nonstandard storage control protocols are defined and introduced by different manufacturers.

Take the flash disk as an example. Since the standard protocol in the operating system is originally defined for basic transmitting and input/output (I/O) functions of files, to add values to the products and for the convenience of users, manufacturers further develop various application programs beyond the basic functions (e.g., the disk encryption function). However, the driver program has to be modified in order to add these nonstandard functions under a nonstandard protocol. This in turn results in the compatibility problem.

Figure 1:
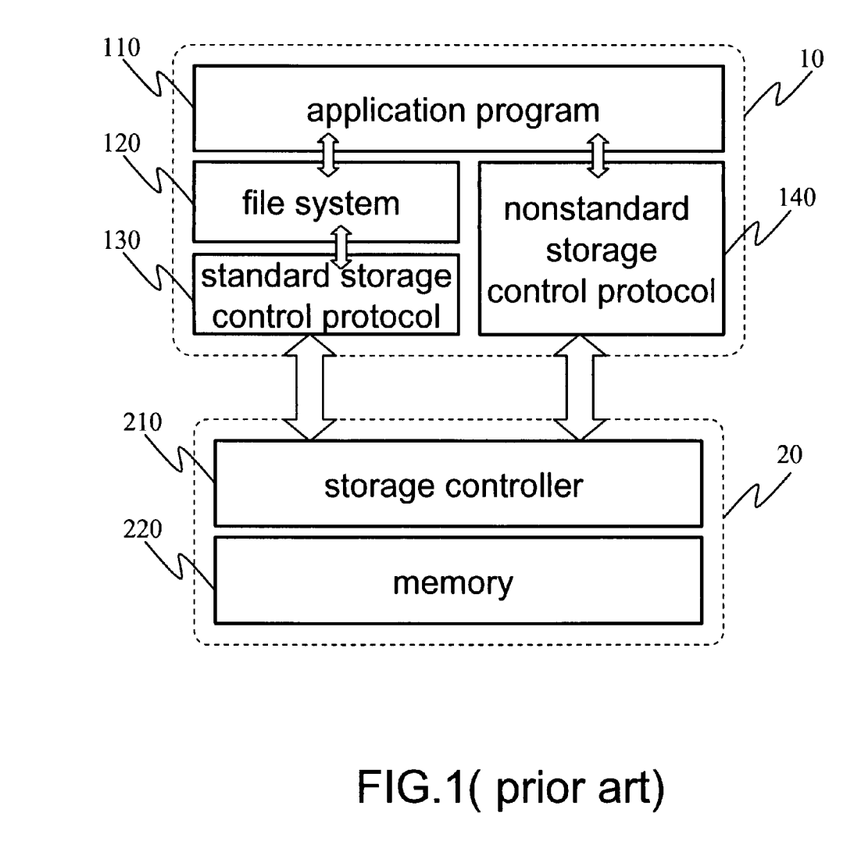
FIG. 1 is a schematic view of a conventional storage device in the prior art.

FIG. 1 shows a schematic view of a conventional storage device 20 communicating with a computer 10 using a nonstandard control protocol 140. The original storage controller 210 uses the driver program compliant with the standard storage control protocol 130 to communicate with the application program. If some new function needs to be added to the storage controller 210 and part of the hardware design has to be modified, the driver program has to be modified accordingly in order for the function to be used in the application program 110. Since the original standard storage control protocol 130 is not designed with this, a driver program with a nonstandard storage control protocol 140 has to be written for the newly added function on top of the original communication method. When the application program 110 calls for the new function, the task can be achieved using the driver program with the nonstandard storage control protocol 140. An exclusive command pipe is generated to communicate with the storage controller 210.

Suppose the storage device 20 is a flash disk. Through a file system 120, the application program 110 can directly save a file into the memory 220 of the storage device 20 after the file is processed according to the standard storage control protocol 130 and received by the storage controller 210. Using the same method, the file in the memory 220 of the storage device 20 can be read and modified. If the manufacturer wants to add an encryption protection function to the storage device 20, a driver program has to be written for the encryption function in addition to adding a hardware element with the encryption mechanism on the storage controller 210.

Adding some nonstandard storage control protocol 140 to the driver program for the encryption function will enlarge the size of the driver program as well as complicate the application program 110. Since a nonstandard storage control protocol 140 is used, the portability of the product on various kinds of operating systems has to be taken into account. Modifying the driver program for multiple operating systems will greatly increase the development cost and elongate the developing time. Also, subsequent maintenance of the driver program is also a serious problem. Therefore, how to find a most convenient way of modifying the driver program as well as to shorten the developing time is an important issue in the field.

SUMMARY OF THE INVENTION

In view of the foregoing, an object of the invention is to provide a communication method for storage devices on the basis of file access. Using virtual files in memory of a computer, the application program and the storage controller can achieve communications.

To achieve the above object, a communication method for storage devices on the basis of file access disclosed herein includes at least the following steps:

First, the storage controller establishes a command file pipe and a response file pipe in the memory of a computer. Then, the application program writes a command into the command file pipe. When the new command file transferred from the command file pipe is detected, the storage controller determines whether it is a valid command file.

If it is valid, then the storage controller reads the command given by the application program from the command file using the standard file opening method. Afterwards, a response message along with returning parameters are output to the response file pipe after the command is executed. Finally, the application program has a control over the execution situation from the message in the response file.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention discloses a communication method for storage devices on the basis of file access. Many specific details are described in the following description for a complete understanding of the invention. However, a person skilled in the art can implement the invention without referring to the disclosed details or by equivalent elements or method in replacement. Other known methods, procedures, components, and circuits used in the invention will not be described in detail in order not to confuse with the essence of the invention.

Figure 2:
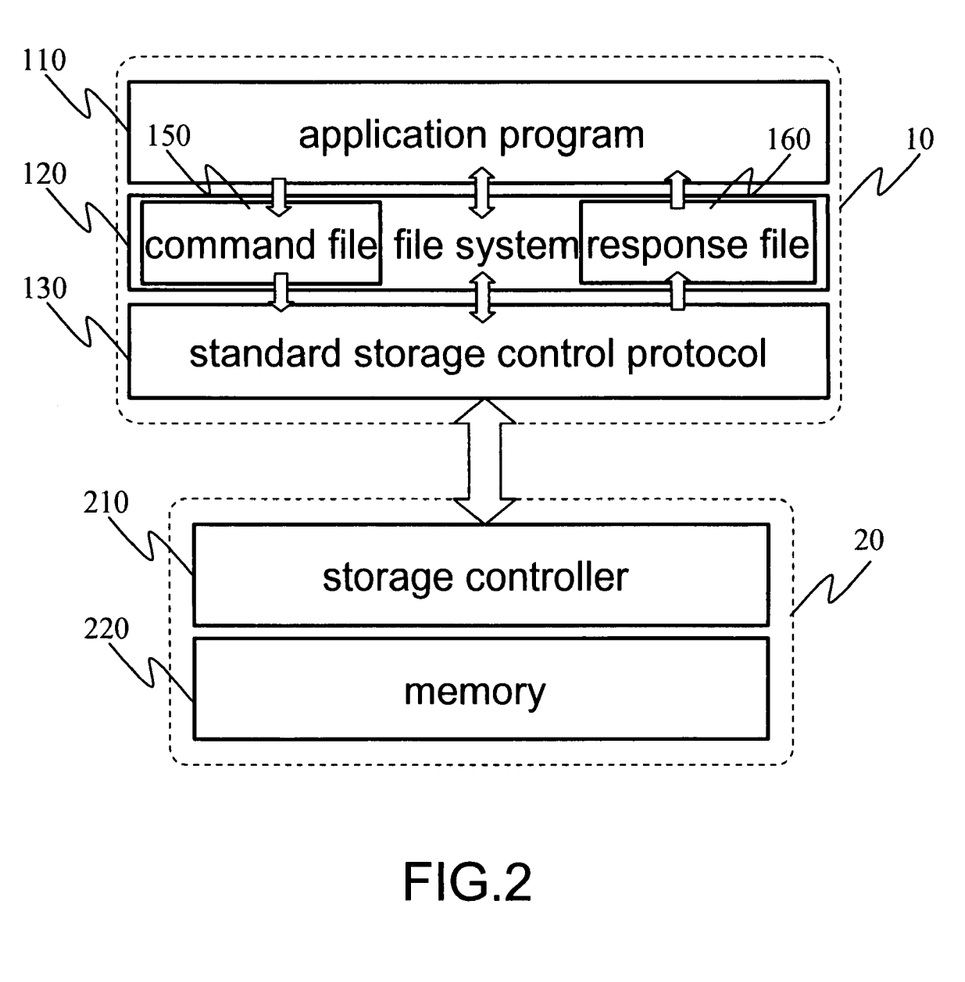
FIG. 2 is a schematic view of the first embodiment of the invention.

FIG. 2 shows the first embodiment of the invention. The difference between the embodiment and the conventional structure is in that the storage controller 210 can communicate with the application program 110 without using the driver program written for a nonstandard storage control protocol. When the storage device 20, such as a flash disk that provide encryption protection for the contents stored therein, establishes a connection with the computer 10 via a USB (universal serial bus) port, two pipes can be simulated at the file system 120 level using the standard storage control protocol 130. One is the command file pipe for receiving a command in the nonstandard storage control protocol transferred from the application program 110. The other is the response file pipe. Once the storage controller 210 completes the command recorded in the command file 150, a response message, returning parameters, as well as the sequence number of the executed command are written in the response file 160. The application program 110 can thus analyze the message transmitted from the response file pipe to get the information of execution situation.

Figure 6A:
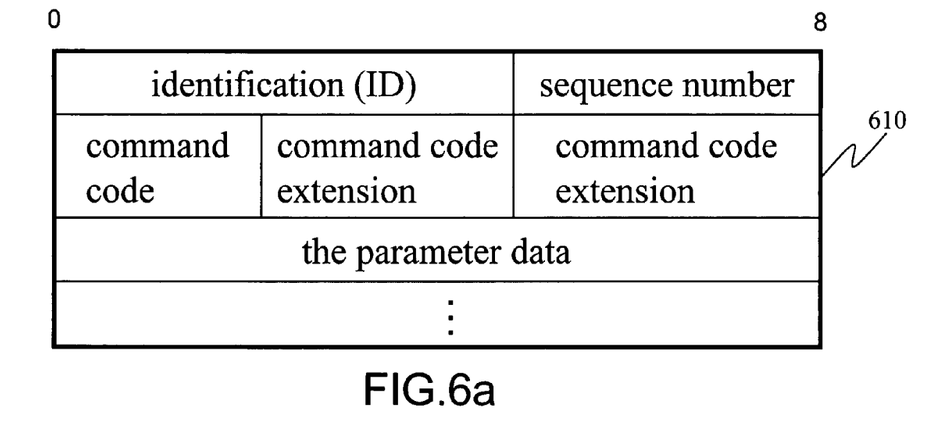
FIG. 6a shows the format of the binary command file in the first embodiment.

The simulated two pipes are represented by the file system 120 as two files with special functions. Even though the user can view and edit the two files in the storage device 20, they actually are not stored in the storage device 20 but simply virtual ones in the memory of the computer 10. They can be binary files, as the command binary file and the response binary file illustrated in FIGS. 6*a* and 6*b*. The command binary file 610 contains: an identification (ID) field for indicating which application program generates the command; a sequence number field filled with a number generated in sequence or by a random number generator as the ID of the command file; a command code field for storing the command in a nonstandard storage control protocol (when the command is larger than the space of the command code field, a command code extension field is used as a buffer for storing the command); a parameter data length field for storing the length of parameters as a reference for checking the parameter data and preventing the parameter data from being lost during the transmission processes; and multiple parameter data fields for storing parameter data.

Figure 6B:
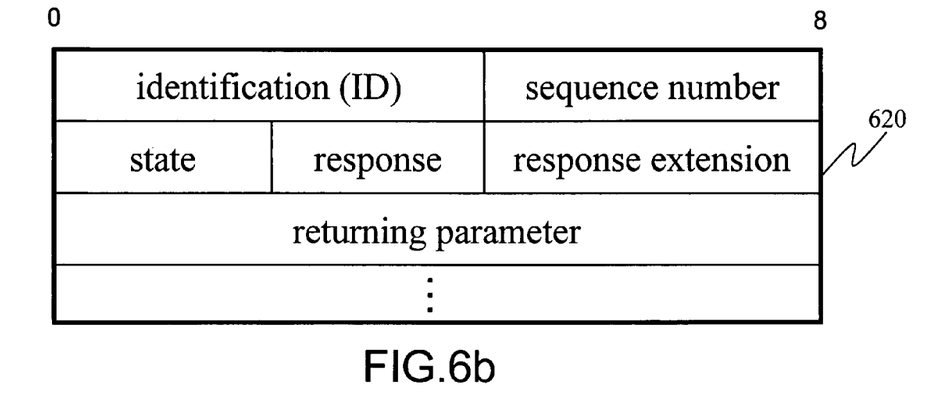
FIG. 6b shows the format of the binary response file in the first embodiment.

The response binary file 620 contains: an ID field for indicating which application program generates the response message; a sequence number field indicating the command of which sequence number is executed by the storage controller 210 to generate the response file (so that the current sequence number is the same as the sequence number of the corresponding command file); a state field for indicating whether the command execution by the storage controller 210 is successful; a response field for recording which recognizable error occurs during the command execution; and multiple returning parameter fields for storing the returning parameters.

Figure 7A:
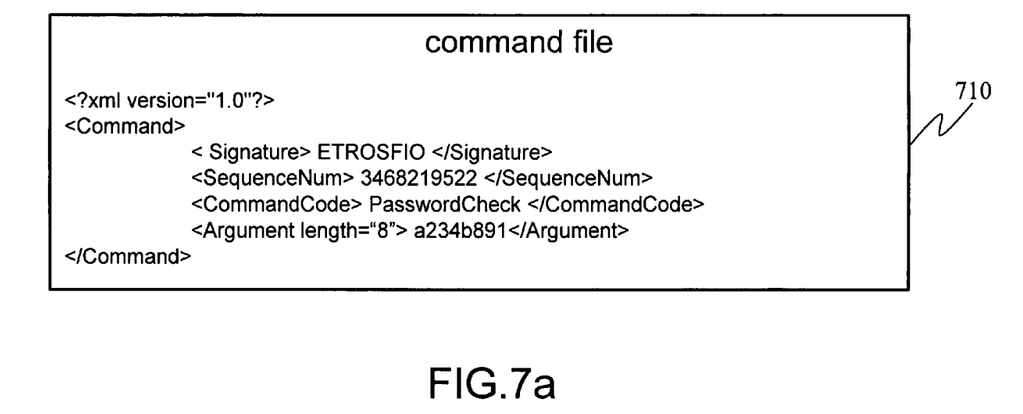
FIG. 7a shows the format of the text command file in the first embodiment.
Figure 7B:
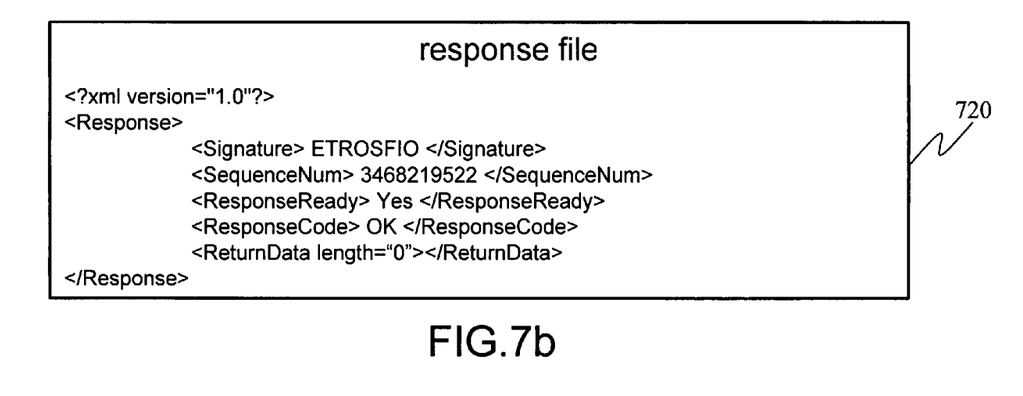
FIG. 7b shows the format of the text response file in the first embodiment.

Besides, the two files with the special functions can be regular text files, as illustrated in FIGS. 7*a* and 7*b*. They show schematic views of the command file and response file in the extensible markup language (XML). Tags are used to label the data fields, so that the user can use an ordinary text editor to directly edit or modify the two files with special functions. However, the edited contents have to comply with the format and contents recognizable by the storage controller 210 and the application program 110. In other words, the two files with special functions are accessible and recognizable by both the storage control device 210 and the application program 110. In this case, the command given in the command file 150 can be executed.

Take FIGS. 7*a* and 7*b* as an example. Suppose the storage device 20 is a flash disk that can provide encryption protection for the contents stored therein. When the user wants to read data in the disk from the computer 10, the storage control device 210 detects the command transferred from the standard control protocol 130 by the application program 110. Since the data in the memory 220 are protected by encryption, a correct password is required to access. Therefore, a response message of asking for a password is transmitted via the response file pipe. The application program 110 analyzes the message in the field of "<ReturnData>" in the response file text file 720 and executes the corresponding password input module for the user to enter a decryption code.

After the input is complete, the password input module writes the received password along with the command into the command text file 710, such as "PasswordCheck a234b891" where "PasswordCheck" is recorded in the field labeled by "<CommandCode>". This command is undefined in the original standard storage control protocol 130; therefore, it cannot follow the normal pipe to the storage controller 210. Once the command given by the application program 110 is written into the file, it can be obtained by opening and reading the command text file 710. Afterwards, the system starts password checking. It verifies the subsequent "<Argument length="8">" parameter data field that contains information of length 8 to check if the entered password "a234b891" is correct. If it is correct, then the response text file 720 containing "<Signature>" that labels the title of the application program 110 as "ETROSFIO" is returned. After the application program 110 receives the returned message, it decodes the sequence number "3468219522" labeled by "<SequenceNum>" to obtain the corresponding command. From the subsequent message, it is known that the password checking is done. Then the system can follow the standard storage control protocol 130 to transmit data in the flash disk and correctly display it in the application program 110 using the file system 120. If the password is verified to be incorrect, then the field labeled by "<ResponseCode>" in the response text file is written with an error message. Once the application program 110 discovers that the response text file 720 is updated, it reads and analyzes the file, and displays the error message and executes the password module again for the user to enter a correct password.

Figure 3:
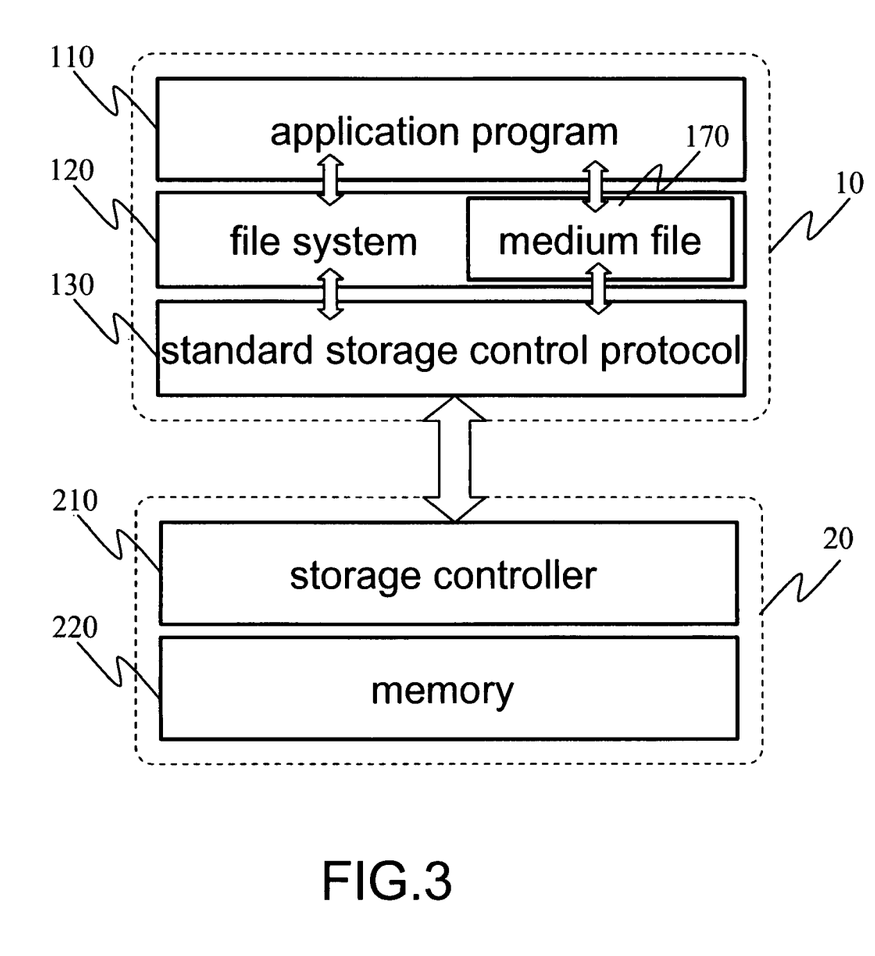
FIG. 3 is a schematic view of the second embodiment of the invention.

Another embodiment of the invention is illustrated in FIG. 3. This is a schematic view of the second embodiment of the invention. The difference between this second embodiment and the first embodiment in FIG. 2 is that the command file pipe and response file are combined into a medium file pipe. When the application program 110 generates a command and writes into the medium file 170, a sequence number is inserted before the command. After the storage controller 210 completes the command, a response message is written into the medium file 170, with a corresponding sequence number inserted before the response message too. This can prevent the complication in handshaking. Another method is to use the time at which the command is sent out as the identification. This time stamp information replaces the function of the sequence number.

Figure 4:
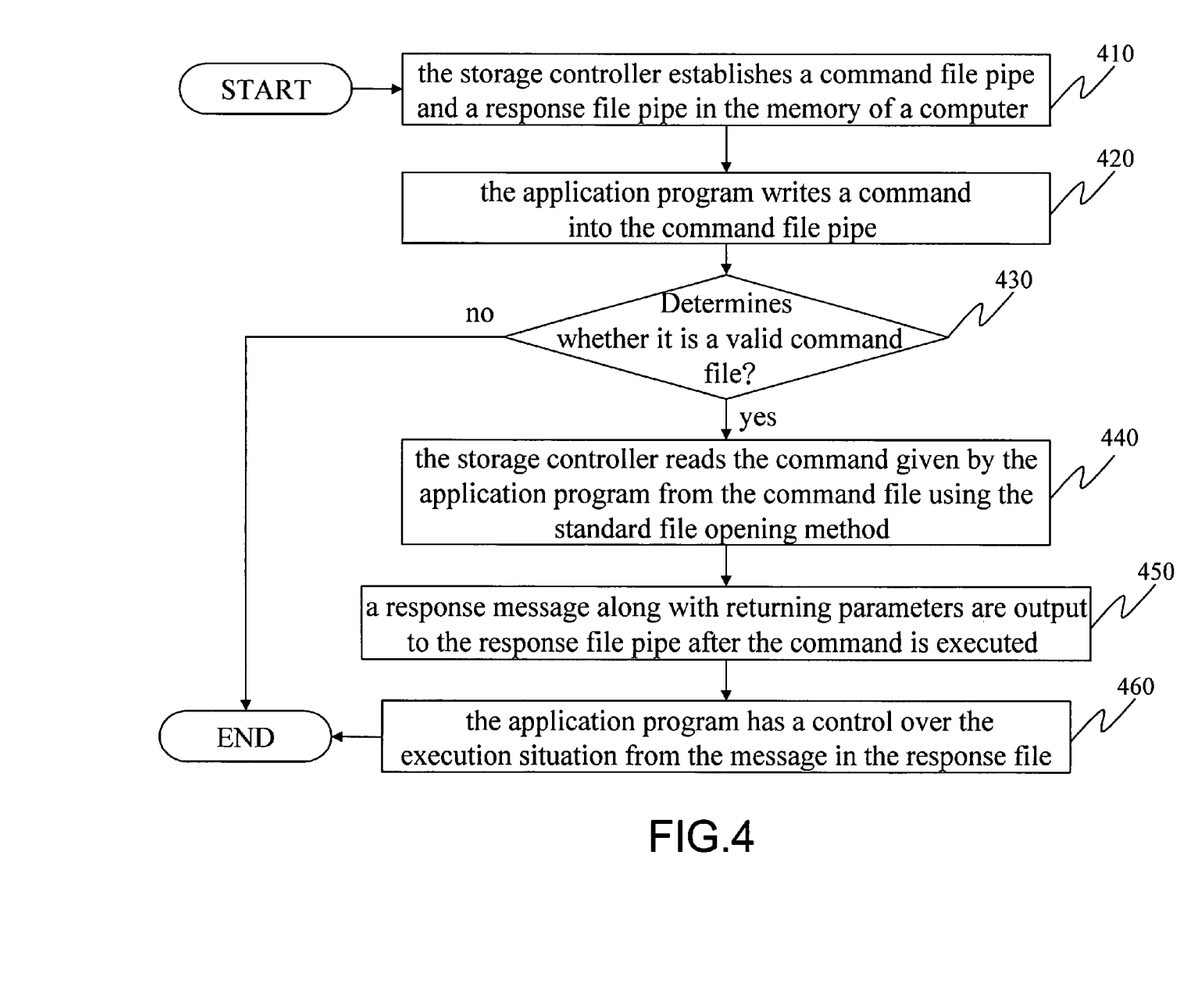
FIG. 4 is a flowchart of the method in the first embodiment.

FIG. 4 shows the flowchart in the first embodiment. When the storage device 20 is inserted into the computer 10, the storage controller 210 establishes a command file pipe and a response file pipe in the memory of the computer (step 410). Afterwards, the application program 110 writes the command belonging to the nonstandard storage control protocol 140 and its corresponding sequence number into the command file pipe (step 420). Since the command file 150 may be entered by the user, it has to be checked whether it is a valid command file 150 (step 430). Once the command file 150 is verified as a valid one, i.e., compliant with the required format (for example, the sequence numbers are generated and risen with increasing time, by some mathematical functions, or random combinations of a particular set of letters and numbers), then the procedure continues to the next step. If the command file 150 entered by the user is not compliant with the defined format, then the storage controller 210 does not react. In the case of a correct format, the storage controller 210 reads the command given by the application program 110 in the command file 150 following the standard file opening procedure (step 440). After the command in the command file 150 is executed, the response message, returning parameters, and the corresponding sequence number of the command are written into the response file 160 (step 450). Finally, the application program 110 understands the situation of command execution according to the messages in the response file 160 (step 460).

Figure 5:
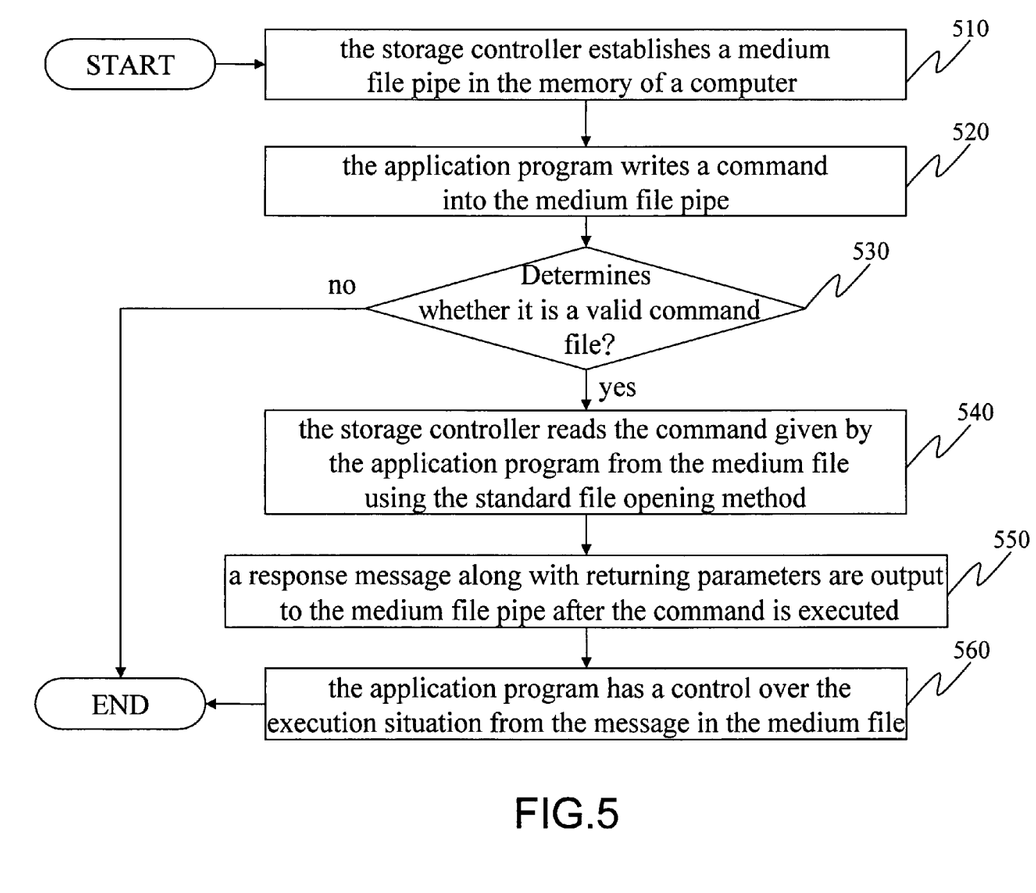
FIG. 5 is a flowchart of the method in the second embodiment.

Likewise, FIG. 5 shows the flowchart in the second embodiment illustrated in FIG. 3. When the storage device 20 is inserted into the computer 10, the storage controller 210 establishes a medium file pipe in the memory of the computer (step 510). The application program 110 then writes the command in the nonstandard storage control protocol 140 along with a sequence number into the medium file pipe (step 520). Since the medium file 170 may be entered by the user, it has to be checked whether it is a valid medium file 170 (step 530). Once the medium file 170 is verified as a valid one, i.e., compliant with the required format, then the storage controller 210 reads the command given by the application program 110 in the medium file 170 using the standard file opening method (step 540). After the command in the medium file 170 is executed, the response message, returning parameters, and the corresponding sequence number of the command are written into the medium file 170 (step 550). Finally, the application program 110 understands the situation of command execution according to the messages in the medium file 170 (step 560).

In summary, according to the disclosed method, no driver program for a nonstandard storage control protocol 140 needs to be developed when a storage controller 210 is added with a new function belonging to the nonstandard storage control protocol 140. Besides, the application program 110 does not need to be modified into a more complicated program module. Once the special command to be executed is written into the command file 150, it can be transmitted to the storage controller 210 via the standard storage control protocol 130. This achieves the communication of special commands between the computer 10 and the storage device 20. Since the command file 150 and the response file 160 are ordinary data files, any operating system can support the disclosed method. Therefore, the invention can be readily applied to various platforms. At the same time, the invention greatly reduces the complexity and size of application programs and shortens the developing time thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication method for storage devices on the basis of file access used between a storage controller with a function of a nonstandard storage control protocol and an application program in a computer capable of generating a plurality of commands in the nonstandard storage control protocol, with a command file pipe and a response file pipe generated by the storage controller in a memory of the computer, the method comprising the steps of:

writing each of the commands into the command file pipe by the application program;

receiving a command file by the storage controller from the command file pipe;

opening the command file and reading each of the commands given by the application program;

executing each of the commands and writing a plurality of response messages and returning parameters thus generated into the response file pipe; and decoding a received response file and showing the situation of command execution in the application program;

wherein the command file and the response file are recognizable by both the application program and the storage controller.

2. The communication method for storage devices on the basis of file access according to claim 1, wherein the command file and the response file are text files.

3. The communication method for storage devices on the basis of file access according to claim 1, wherein the command file and the response file are binary files.

4. The communication method for storage devices on the basis of file access according to claim 1 further comprising the step of verifying whether the command file is a valid command file.

5. The communication method for storage devices on the basis of file access according to claim 1, wherein the command file and the response file are stored in the memory while displayed to be stored in the storage device.

6. The communication method for storage devices on the basis of file access according to claim 1, wherein the command file contains a corresponding sequence number.

7. The communication method for storage devices on the basis of file access according to claim 6, wherein the corresponding sequence number is randomly generated.

8. The communication method for storage devices on the basis of file access according to claim 1, wherein the response file contains a sequence number corresponding to the execution of the command.

9. The communication method for storage devices on the basis of file access according to claim 1, wherein the command file contains a time stamp for the command.

10. A communication method for storage devices on the basis of file access used between a storage controller with a function of a nonstandard storage control protocol and an application program in a computer capable of generating a plurality of commands in the nonstandard storage control protocol, with a medium file pipe generated by the storage controller in a memory of the computer, the method comprising the steps of:

writing each of the commands into the medium file pipe by the application program;

receiving a medium file by the storage controller from the medium file pipe;

opening the medium file and reading each of the commands given by the application program;

executing each of the commands and writing a plurality of response messages and returning parameters thus generated into the medium file pipe; and decoding the medium file and showing the situation of command execution in the application program;

wherein the medium file is recognizable by both the application program and the storage controller.

11. The communication method for storage devices on the basis of file access according to claim 10, wherein the medium file is a text file.

12. The communication method for storage devices on the basis of file access according to claim 10, wherein the medium file is a binary file.

13. The communication method for storage devices on the basis of file access according to claim 10 further comprising the step of verifying whether the medium file is a valid medium file.

14. The communication method for storage devices on the basis of file access according to claim 10, wherein the medium file is stored in the memory while displayed to be stored in the storage device.

15. The communication method for storage devices on the basis of file access according to claim 10, wherein the medium file contains a corresponding sequence number.

16. The communication method for storage devices on the basis of file access according to claim 15, wherein the corresponding sequence number is randomly generated.

17. The communication method for storage devices on the basis of file access according to claim 10, wherein the medium file contains a sequence number corresponding to the execution of the command.

18. The communication method for storage devices on the basis of file access according to claim 10, wherein the medium file contains a time stamp for the command.

* * * * *

UNITED STATES PATENT AND TRADEMARK OFFICE
CERTIFICATE OF CORRECTION

| | | |
|---|---|---|
| PATENT NO. | : 7,840,716 B2 | |
| APPLICATION NO. | : 11/272806 | |
| DATED | : November 23, 2010 | |
| INVENTOR(S) | : Fan-Sheng Lin et al. | |

It is certified that error appears in the above-identified patent and that said Letters Patent is hereby corrected as shown below:

On the Title Page, Item 74 (Attorney, Agent, or Firm)

"Radin & Berdo, P.C." should be changed to --Rabin & Berdo, P.C.--

Signed and Sealed this
Eighteenth Day of December, 2012

David J. Kappos
*Director of the United States Patent and Trademark Office*